UNITED STATES PATENT OFFICE.

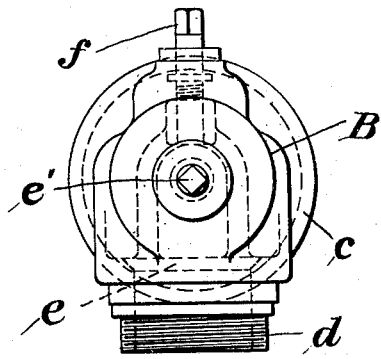
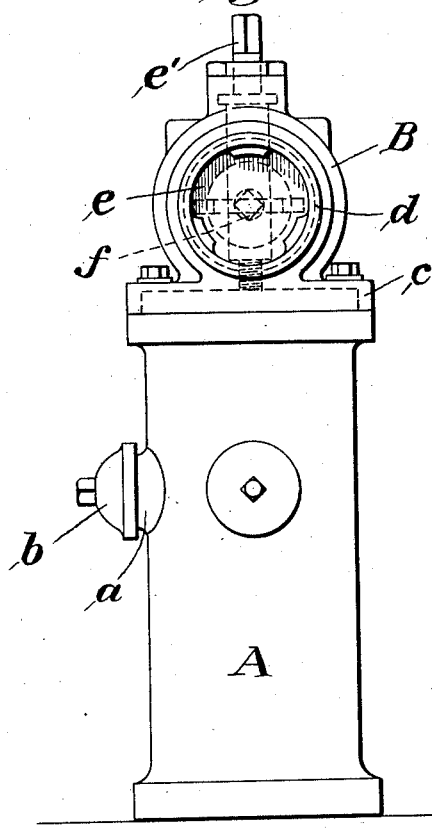

THOMAS H. MEUSHAW AND CONRAD J. DIEZ, OF BALTIMORE, MARYLAND.

FIRE-PLUG.

1,381,729.   Specification of Letters Patent.   Patented June 14, 1921.

Application filed August 13, 1920. Serial No. 403,425.

*To all whom it may concern:*

Be it known that we, THOMAS H. MEUSHAW and CONRAD J. DIEZ, citizens of the United States, and residents of Baltimore, Maryland, have invented certain new and useful Improvements in Fire-Plugs, of which the following is a specification.

Our invention relates to a fire plug and is designed to add to the ordinary plug now in use a cap which will contain a coupling for the attachment of the suction hose of the ordinary fire engine and is particularly adapted for use as an attachment for hydrants having no suction connection but only the ordinary hose connection. In the accompanying drawing we have shown in—

Figure 1 an elevation of an ordinary hydrant and a cap surmounting the same embodying our invention.

Fig. 2 is a plan view.

In these figures the ordinary hydrant is shown at "A" provided with a hose coupling at " $a$ " capped at " $b$." In order to make this hydrant capable of use with a fire engine, we take off the ordinary cap plate and apply our improved cap shown at " B " which has a flange "$c$" adapted to be bolted to the top of the hydrant and surmounting this flange is a chamber closed on all sides but one, and on this side there is a coupling connection "$d$" adapted to receive the end of the suction hose of the engine. Normally the opening in this coupling is closed by a valve "$e$" operated by a handle "$f$."

We may also use a second valve to close the passage from the plug to the cap actuated and controlled by a valve stem $e'$.

Except when it is intended to use this hydrant in connection with an engine, the ordinary hose connections in the body of the hydrant are utilized, but when it is desired to apply the suction hose of an engine this is simply connected up to the coupling $d$ the valve stem $e'$ operated to open its valve and the valve $e$ moved through its stem $f$ and the water is then capable of being pumped through the engine to the hose leading to the fire.

The invention is not only very simple but it makes effective for the use of suction pipes without reconstruction a great number of hydrants now in use, and hence it constitutes an exceedingly economical attachment.

What we claim is:

1. A cap attachment for hydrants having an open bottom and adapted to be secured to a hydrant, a valve controlling the flow of water to the cap and a valved outlet from the cap, substantially as described.

2. The device of claim 1, means to actuate said first mentioned valve passing upwardly through said cap.

In testimony whereof we affix our signatures.

THOMAS H. MEUSHAW.
CONRAD J. DIEZ.